Feb. 26, 1957 V. M. VASSILIEV 2,783,355
FIXED ELECTRODE WATER HEATER
Filed Nov. 10, 1955 3 Sheets-Sheet 1
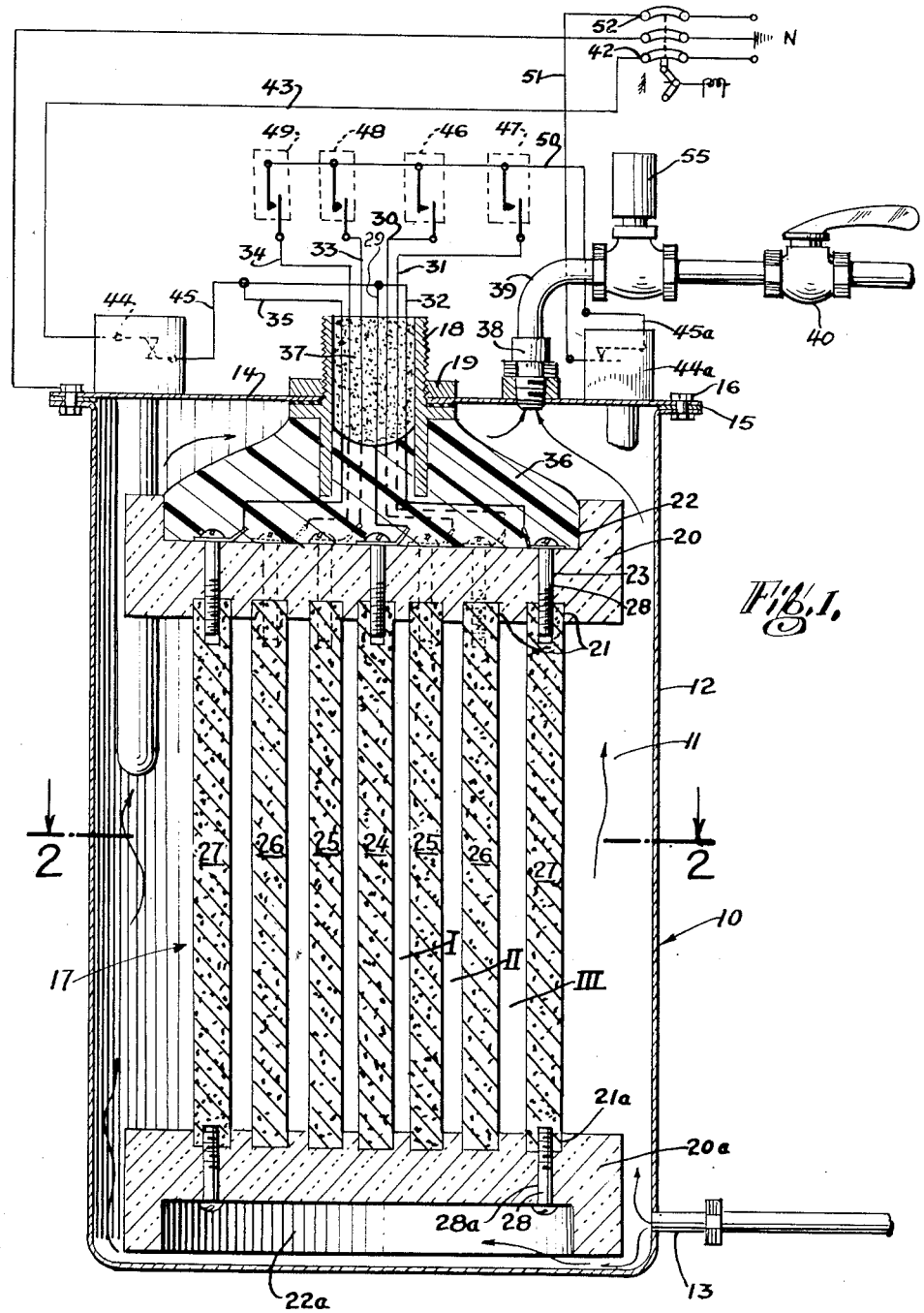
INVENTOR
Vladimir M. Vassiliev
BY
Kenyon & Kenyon
ATTORNEYS Feb. 26, 1957 V. M. VASSILIEV 2,783,355
FIXED ELECTRODE WATER HEATER
Filed Nov. 10, 1955 3 Sheets-Sheet 2
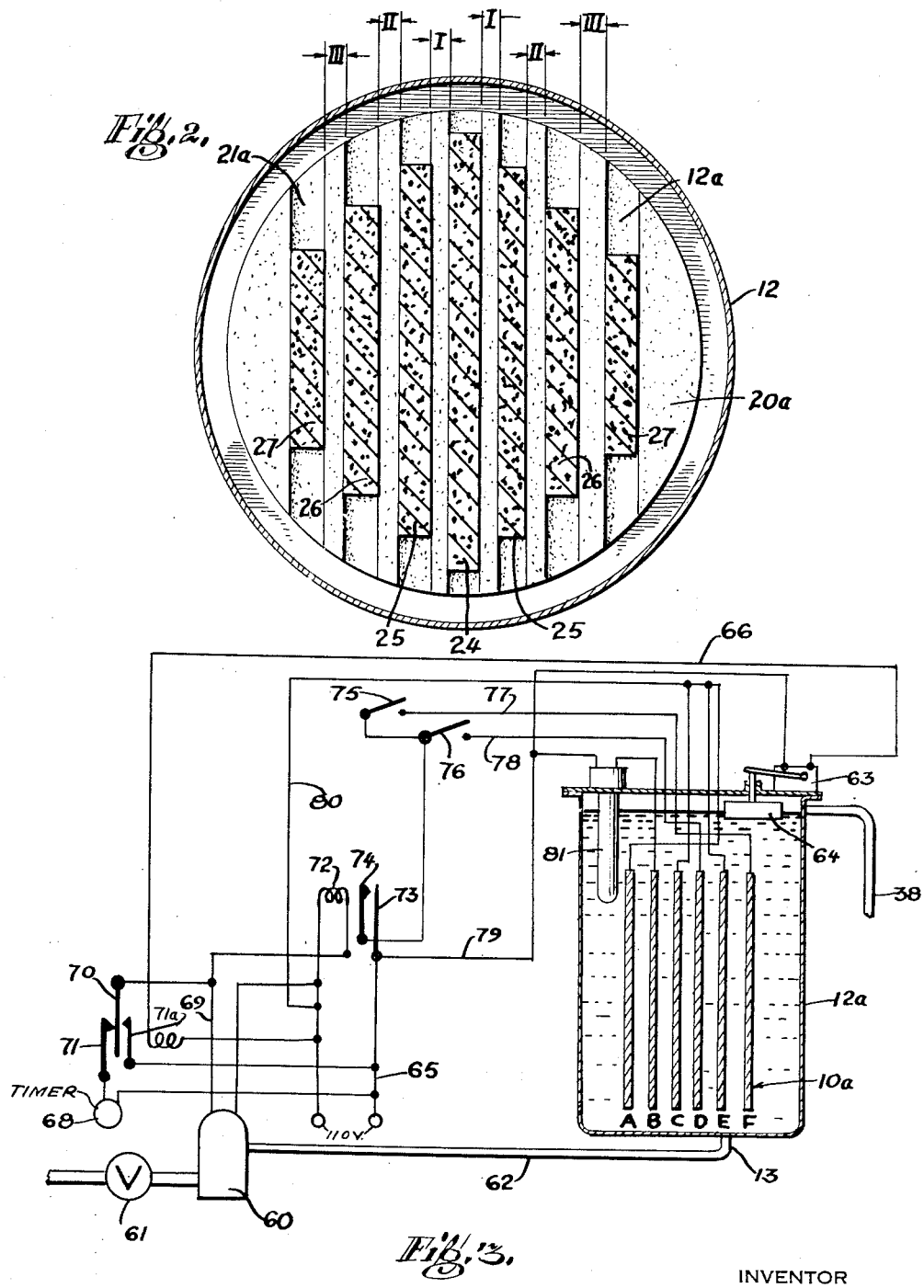
INVENTOR
Vladimir M. Vassiliev
BY
Kenyon & Kenyon
ATTORNEYS

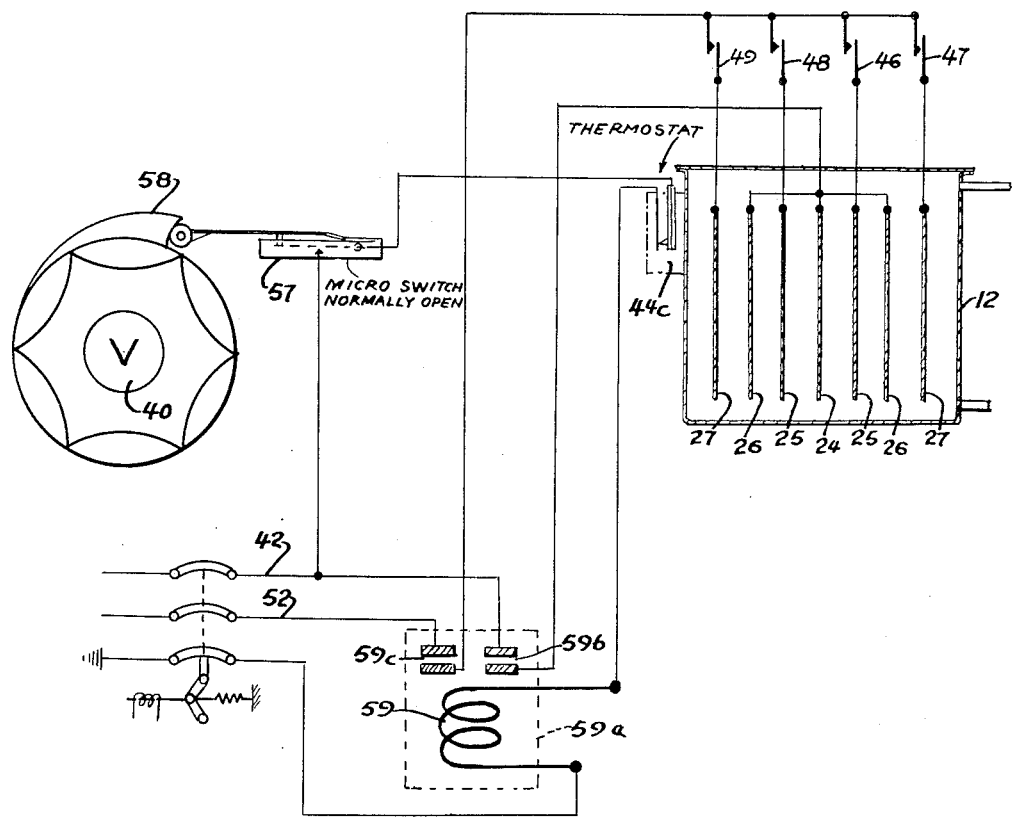

2,783,355
Patented Feb. 26, 1957

2,783,355
FIXED ELECTRODE WATER HEATER

Vladimir M. Vassiliev, Little Neck, N. Y., assignor, by mesne assignments, to Carbon Heater Corporation, New York, N. Y., a corporation of New York Application November 10, 1955, Serial No. 546,162

7 Claims. (Cl. 219—40)

This invention relates generally to apparatus for heating of electrolytes and more particularly to improvements in electrical water heaters.

Electrical water heaters are known wherein heating is effected by conduction of alternating electrical current through the water, the water acting as a resistance. Heaters of this character usually make use of spaced movable carbon electrodes arranged in opposing relationship and between which the water circulates. It has been found that waters at various localities, by reason of their mineral content possess different electrical resistance characteristics. Consequently, for a given voltage supply, different waters which are to be heated to approximately the same temperature require different adjustments in the spacing or effective area between the electrodes. Provision of means for making such adjustments are often difficult and expensive. Sometimes such means are likely to fail at needed times either because of corrosion or short circuits. Moreover, such means frequently are expensive and difficult to manufacture.

Objects and features of the instant invention are the provision of an electric conduction type water heater utilizing fixed electrodes of differing dimensions and spacing between electrodes in which water to be heated flows between the electrodes. Control of current flow through the water to provide desired heating on waters of differing conductivities is effected by appropriate control switches connected with various of the electrodes so that as many or as few of the electrodes as required may be introduced into the electric circuit to provide needed heating current flow through the water passing through the heater.

An electrical water heater even of considerable power embodying these features is simple, compact and cheap to manufacture and is readily adaptable for use with differing water conditions and sources of power supply. Moreover, since no moving parts are involved, possible short circuits due to corrosion or other factors are eliminated. The heaters embodying the invention, in addition, have long lives and are not subject to appreciable wear or to breakdown in use.

Other objects and features of the invention will become apparent from the following specification and the accompanying drawings, wherein:

Figure 1 is a vertical section of an electrical water heating apparatus embodying the present invention;

Fig. 2 is a transverse section taken along the plane of line 2—2 of Fig. 1 and viewed in the direction of the arrows; and Fig. 3 and 3a are diagrammatic showings of two electrical circuits that can be used in connection with the heater of this invention.

Referring now to the drawings, the electrical heating apparatus 10 embodying the invention comprises a water heating chamber 11 defined, for example, by a cup-shaped casing 12, made preferably of metal, such as stainless steel or the like. This casing at its bottom is provided with an inlet nipple 13 which is connected to a conventional water main. A removable lid 14 is provided to close off the upper open end of casing 12 in sealed relationship, for example, by use of the sealing gasket 15 and the bolts 16.

An electrical water heater unit 17 is supported by the lid 14, for example, by a threaded metallic bushing 18 extending from the unit 17 and by the nut 19. The unit 17 comprises a pair of like insulating disc-like elements 20 and 20a preferably of ceramic material each of smaller diameter than that of the casing 12.

The elements 20 and 20a, respectively, have like numbers of transversely disposed parallel grooves 21, 21a in one face and recesses 22, 22a in their opposite faces. The mid ones of the respective grooves 21 and 21a are disposed as diametrical chords of the respective elements while the other grooves 21 and 21a are lesser chords that lie parallel with the mid-chord grooves and are symmetrically disposed on opposite sides of said mid-chord grooves with progressively increasing spacing outwardly from the mid-chord grooves. Screw holes 23 and 23a are provided in the elements 20 and 20a for purposes presently to be described.

Electrode plates 24, 25, 26 and 27 preferably of carbon or graphite are provided for assembly with the end elements 20 and 20a. All the plates have like length and like thickness but have differing widths, electrode 24 has the greatest width being equal approximately to the length of the center or mid-grooves 21 and 21a, while the electrode plates 25, 26 and 27 have progressively decreasing widths. These plates 24, 25, 26 and 27 are assembled with the end elements 20 and 20a so that their ends lie within oppositely disposed grooves 21, 21a of the elements 20 and 21 and they are all secured in place to the end of element 20 as by the bolts 28 which pass through the screw holes 23. Similar bolts 28a passing through screw holes 23a serve to fasten the lower end element 20a to the lower ends of various of the electrode plates. With the electrode plates assembled with said end elements as just described, the central electrode plate element has the greatest width and the respective electrode plates 25, 26, 27 on opposite sides thereof have progressively smaller width and have progressively larger spaces I, II and III between each other.

The screws 28 engaging the respective electrode plates 24, 25, 26 and 27 serve as electrical terminals therefore and they are connected respectively to independent lead wires 29, 30, 31, 32, 33, 34 and 35. These lead wires are heavily insulated and after connection to the respective screws 28 the heads of said screws and the bared portions of said wires are coated over with a plastic thermosetting covering of insulative material. The lead wires are then passed through the tubular bushing 18 and the latter is secured permanently to the upper end element 20 in a centralized position by embedment in a setting cementitious material 36 which is applied as a filling in the recess 22 of the upper end element 20. The material 36 may be cement, or any desirable heat-resistive self-setting cementitious material. When the latter has set, a plastic filling 37 is inserted or poured into the tubular member 18 surrounding the lead-in wires 29–35 inclusive, passing therethrough to secure them rigidly, water tightly and insulatively to said member 18 and to prevent their being accidentally pulled away from the screws 28 to which they are secured.

An outlet coupling 38 is provided in the lid 14. This coupling is connected by a conduit 39 to a control valve 40. This control valve 40 may be an ordinary faucet, gate valve or some electrically operated device like a conventional solenoid valve. In all such instances the system is a closed one, meaning that the tank is under constant pressure of the incoming water to inlet 13 from the main. It is, however possible to devise a system by which the conduit 39 ends with an open outlet while some mechanically or electrically operated valve (not shown) controls the inlet 13, and by opening same pushes the heated water from the tank through the conduit 39. In the latter case the system is an open one with no pressure in the tank, if the diameter of inlet 13 is equal to that of outlet 39. These conventional valves either at the inlet or the outlet are not shown in detail in the drawings. The entire electric input into the heater (which can be one, two or three phases) is channeled through a conventional circuit breaker, so as not to overdraw the rating. The circuit breaker will have as many poles as there are phases in the system. From the circuit breaker contacts the power leads 43 and 51 (in a two-phase system) may be connected respectively to thermostatic switches 44 and 44a if the rating does not rise above 25 amps. If higher rating is required and no thermostatic switches for such a rating are available, the leads in conventional manner can go instead to the corresponding poles (as many poles as there are phases) of a conventional relay (not shown) the coil of which is controlled by a single thermostatic switch like switch 44. The lead 45 from one of the thermostatic switches, e. g. switch 44 is connected to the terminals 35, 29 and 32. The lead 45a from the other thermostatic switch will be connected to the bus bar 50 of the switchboard. The lead wires 35, 29 and 32 are connected, respectively, to the extreme left electrode plate 27, the center electrode plate 24 and to the extreme right electrode plate 27. The lead wires 30, 31, 33 and 34 are connected, respectively, to the terminals of independent single pole switches 46, 47, 48 and 49. The other terminals of these switches are connected together by the bus bar 50, via wire 45a, the thermostatic switch 44a, and wire 51 to the second input terminal 52 of the power source. If a relay is used appropriate of its contacts are connected in corresponding ways.

Electrical operation requires at least one of the switches 46, 47, 48 or 49 to be closed. Also, thermostatic switches 44 and 44a must be closed. The heating of the water in the tank will proceed whether the system is open or closed and will stop when the thermostatic switches open after reaching the temperature for which they have been set. As a result, if switch 44 and one of the switches 46, 47, 48 and 49 is closed while the switch 44a is also closed, electrical potential from lines 42 and 52 appears between parallelly connected electrodes 24 and 26, and also the electrodes connected to the closed ones of switches 46, 47, 48 and 49. If all four of these switches are closed all of the electrodes 24 to 27, inclusive, are activated and a maximum electrode area is active in effecting heating of water within the chamber 11. Under these conditions the water is usually very soft and has high resistivity. For harder waters with lower resistivity, fewer of the switches 46, 47, 48 and 49 are opened. Selection of the switches to open depends specifically upon the resistivity of the water to be heated. Moreover, because the areas of the electrode plates differ as does the spacing between adjacent pairs of said electrode plates, a relative large selection of switching combinations is available to care for a large variation in water resistivity or source voltage. For example, all four switches may be closed or any three or any two or any one thereof with differing current flow available for each selection.

If overheating occurs at any time the thermostatic switches 44 and 44a open automatically when water temperature rises above their settings and remain open until cooling of water below the setting of switches 44 and 44a occurs. As a further factor of safety a blow-off valve 55 of conventional type is provided. This valve is adapted to open upon the occurrence of excessive pressures within the chamber 11.

It is sometimes undesirable to keep the heater under power all the time and instead to have it switched on only when water is required. While the first described heater (whether a pressure or an open system) may be called a storage heater (constantly hot), a transit heater (under power only when water is drawn from it), can be provided by following change of the circuit setup as seen in Fig. 3a. The gate valve 40 situated either at the inlet 13 or the outlet 39 can be combined with a cam operated micro-switch 57 (normally open) which will be closed by a cam 58 when the valve 40 opens. This would permit the current to flow, via thermostat 44c through the activating coil 59 of a magnetic contactor 59a and close the pairs of contacts 59b, 59c of the latter and thus (if the thermostat switch 44c is closed) connect electric power from the power lines 42 and 52 to those electrode plates whose switches 46, 47, 48 or 49 are closed. As soon as the flow of water is stopped, the electric contacts 59b, 59c of contactor 59 separate and the heating current flow ceases. While a storage heater is preferably placed into a larger tank (1–2 gal.), the transit heater can be better operated in a small tank (1–2 qts.). It is also possible to build intermediate types of heaters where only one plate, thermostatically controlled, would keep the water hot, while the rest of the plates would be switched on by the flow of water when same is drawn from the tank. A microswitch coupled to the gate valve, a pressure switch closing when pressure drops or any other conventional device of this type could be used for this purpose.

Provision is shown in the circuit diagram of Fig. 3 for semi-automatic operation of a heater 10a embodying the invention in a so-called open system. In this arrangement a normally closed electrically operable gate valve 60 is provided in water line 62 connected to the inlet 13.

The heater outlet 38a is provided at a side of the casing 12a of the heater 10a just above the usual water level maintained within said casing. A float operated switch 63 is carried by the container and its float 64 is positioned by the level of the water in casing 12a so that switch 63 is closed by a lowering of the water level in casing 12a below a determined line. This is essential in timer-controlled operations (as in vending machines and other semi-automatic dispensing machines) where too low a level of water in the tank means insufficient discharge of water during the brief action of the timer. Each time that the float 64 operates, the current switches over via the movable contact 70 from contact 71 to contact 71a. This eliminates the timer 68 during the refill operation and opens the solenoid valve 60. The elimination of the timer is necessary because the timer may control the flow of other commodities than water alone. The discharge of water timed by a conventional timer switch (operated by push button, or by the drop of a coin, or otherwise) is caused by the energization of the lead 69 which opens the solenoid flow control valve 60 for a given period of time and closes the normally open contacts 73—74 of the power relay 72. Via these contacts power flows through the manual switches 75 and/or 76 to the plates F and D and heats the water. The plate B is constantly under power controlled by a thermostatic switch 81. The plates A, C and E are connected parallel to the common lead wire 80.

The float switch 63 serves to maintain a steady level of water in heater 10a and a flow of heating current through water until an attained temperature determined by setting of the thermostatic switch 81 occurs. Variations in resistivity or degrees of hardness of the water are quickly compensated for by opening or closing one or the other or both of the manual switches 75 and 76 to increase or decrease current flow between the electrodes as may be required.

In a practical embodiment of the invention plates 27 each were 4″ long and 1.5″ wide, plates 26 each 4″ long and 2.1″ wide, plates 25 each 4″ long and 2.5″ wide, and plate 24, 4″ long and 3″ wide. The gaps III between plates 27 and 26 were each .2″. The gaps II between plates 26 and 25 were each .15″, and the gaps I between plates 25 and 24 each .1". Such arrangement with all switches 46, 47, 48 and 49, or 75 and 76 closed operated on a line voltage of 110 volts will provide a maximum current flow of 30 amperes using New York City water. Opening of selected of the switches will cut out various of the electrode plates and vary the current flow through the water in accord with the resistivity thereof and the area of the remaining electrode plates which are electrically active. Differing combinations of switch closings and openings make the device readily adjustable for a large variation of water conditions or of available voltage supply.

While specific embodiments of the invention have been disclosed, variations in structural detail within the scope of the claims are possible and are contemplated. There is no intention therefore of limitation to the exact details shown and described.

What is claimed is:

1. An electric water heater comprising a heating element including plate-like electrodes of varying area disposed adjacent each other with varying spacing between the electrodes, separate electrical connectors to the respective electrodes, and means for independently connecting said connectors in an electric circuit.

2. An electric water heater comprising a heating element including parallelly disposed plate-like electrodes of differing areas and varying spacing between adjacent pairs of the electrodes, insulative end members disposed at opposite ends of the electrodes, means for securing the end members to the electrodes, and separate electrical connectors to the respective electrodes extending from one of the end members.

3. An electrical water heater comprising a heating element including plate-like electrodes of differing areas disposed adjacent each other and with varying spacing between adjacent electrodes, separate electrical connectors for the respective electrodes, and an electrical circuit for applying electric potential to the electrodes via their connectors and independently operable switches in said electrical circuit connected to different ones of said connectors for switching selected ones of said electrodes in and out of the electrical circuit.

4. An electrical water heater comprising a heating element including plate-like electrodes of differing areas disposed adjacent each other and with varying spacing between adjacent electrodes, separate electrical connectors for the respective electrodes, and an electrical circuit for applying electric potential to the electrodes via their connectors and independently operable switches in said electrical circuit connected to different ones of said connectors for switching selected ones of said electrodes in and out of the electrical circuit, and thermostatic means for automatically breaking said circuit above predetermined water temperatures within the heater.

5. An electrical water heater comprising a heating element including plate-like electrodes of differing areas disposed adjacent each other, and with varying spacing between adjacent electrodes, separate electrical connectors for the respective electrodes, and an electrical circuit for applying electric potential to the electrodes via their connectors and independently operable switches in said electrical circuit connected to different ones of said connectors for switching selected ones of said electrodes in and out of the electrical circuit, and a normally open switch in said electrical circuit which is responsive to water flow through said heater and is adapted to close automatically during water flow through said heater.

6. An electric water heater comprising a heating element including parallelly disposed plate-like electrodes of differing areas and varying spacing between adjacent pairs of the electrodes, insulative end members disposed at opposite ends of the electrodes, means for securing the end members to the electrodes, separate electrical connectors secured to the respective electrodes and extending from one of said end members, insulative coating means over the joints of the connectors and electrodes, a tubular threaded coupling, and cementitious material fixedly supporting said coupling from said one of said end members, said connectors extending through said tubular coupling and insulative filling means within said tubular coupling to provide rigid insulative support for said connectors therein.

7. The heater of claim 6 wherein said end members have grooves in which the ends of said electrodes are disposed.

References Cited in the file of this patent

UNITED STATES PATENTS

| | | |
|---|---|---|
| 957,667 | Fuller et al. | May 10, 1910 |
| 1,191,743 | Simon | July 18, 1916 |
| 2,444,508 | Horni | July 6, 1948 |